Oct. 27, 1964    T. R. HERRMANN ETAL    3,154,165
HYDRAULIC MOTOR
Filed Nov. 1, 1961    2 Sheets-Sheet 1
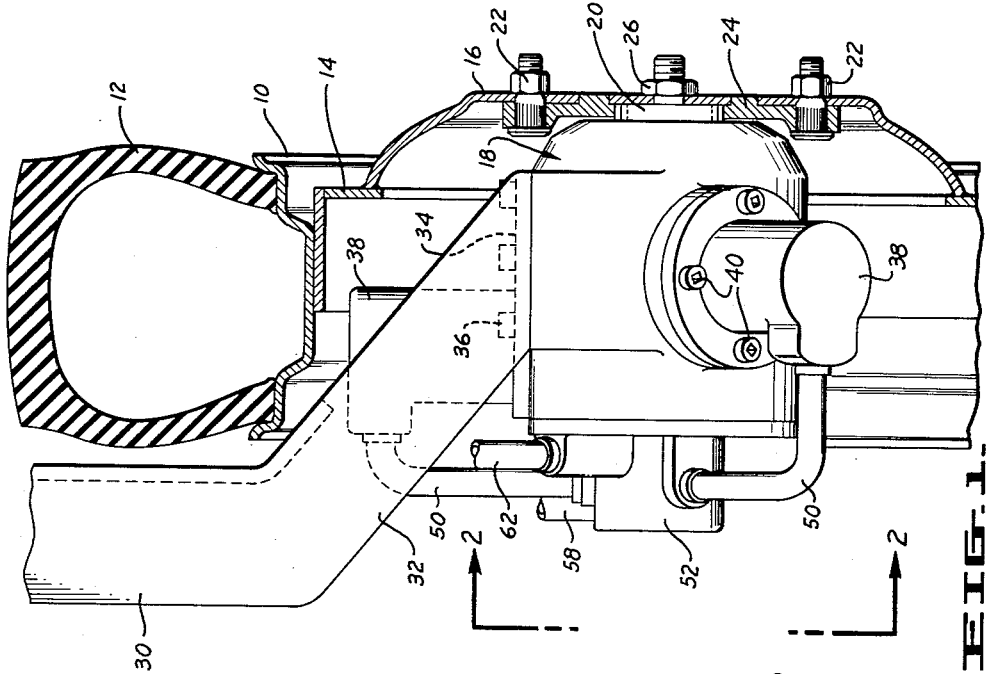
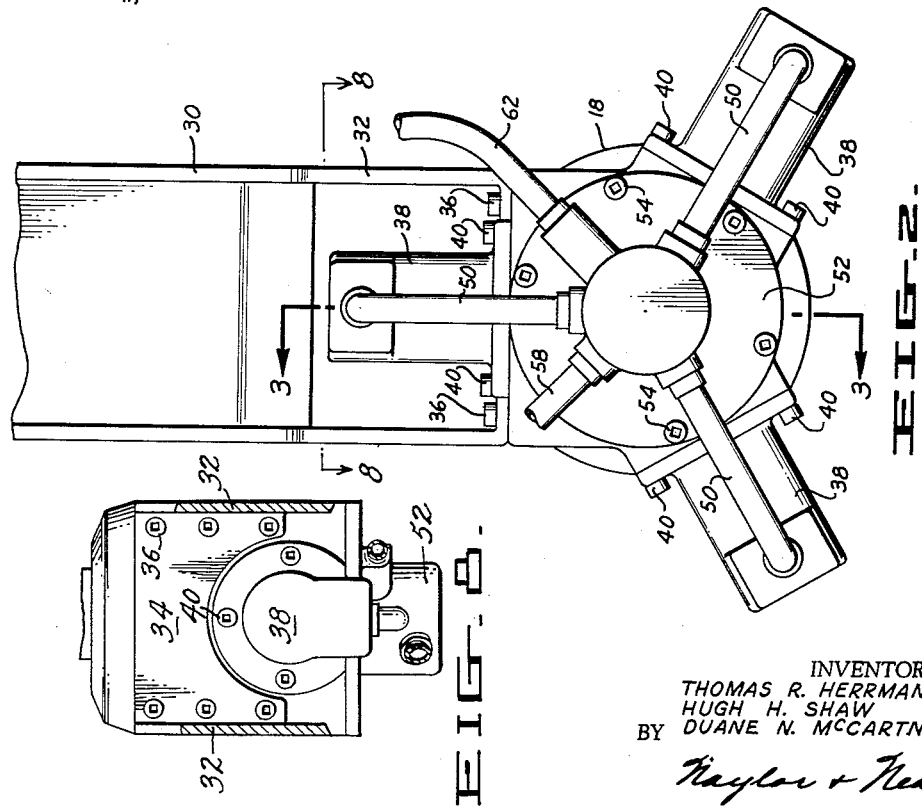
INVENTORS
THOMAS R. HERRMANN
HUGH H. SHAW
BY DUANE N. McCARTNEY
Naylor + Neal
ATTORNEYS Oct. 27, 1964     T. R. HERRMANN ETAL     3,154,165
HYDRAULIC MOTOR Filed Nov. 1, 1961     2 Sheets-Sheet 2

INVENTORS
THOMAS R. HERRMANN
HUGH H. SHAW
BY DUANE N. McCARTNEY

*Naylor & Neal*
ATTORNEYS

United States Patent Office 3,154,165
Patented Oct. 27, 1964

3,154,165
HYDRAULIC MOTOR
Thomas R. Herrmann, Pacific Grove, Hugh H. Shaw, Salinas, and Duane N. McCartney, Pebble Beach, Calif., assignors to Cochran Equipment Company, Salinas, Calif., a corporation of California
Filed Nov. 1, 1961, Ser. No. 149,321
3 Claims. (Cl. 180—66)

This invention relates to vehicles powered by individual wheel hydraulic motors and to the hydraulic motors used therein.

It is a principal object of the invention to provide vehicles which are particularly well adapted for off highway use.

It is another object of the invention to provide such vehicles in which each wheel of the vehicle is powered by its own hydraulic motor whereby the wheels may be driven by hydraulic fluid supplied to the motor through flexible tubes which permit extensive adjustment of the position of the wheels on the vehicle and whereby use of the vehicle on uneven and slippery ground may be facilitated.

It is another object of the invention to provide such vehicles in which the hydraulic motors driving each wheel are supported within the wheels and protrude from the wheels as little as possible so that the motors provide minimum obstruction to the passage of the wheels between rows of crops and the like.

It is another object of the invention to provide such vehicles in which the hydraulic motors in the wheels support the full weight of the vehicle whereby the mounting of the motors on the vehicle and on the wheels is simplified.

It is another object of the invention to provide an improved hydraulic motor to be mounted in a wheel of such vehicle with the motor being capable of being the sole load transmitting means between the vehicle and the wheel.

It is another object of the invention to provide such a hydraulic motor on which a vehicle wheel may be mounted as easily as possible and on which wheels may be replaced without repacking bearings and the like.

Other objects and advantages of the invention will become apparent from the following description read in conjunction with the attached drawings in which:

FIG. 1 is a view in elevation, partially broken away, of apparatus of this invention showing a hydraulic motor mounted within the wheel of a vehicle;

FIG. 2 is a view in elevation of the hydraulic motor of FIG. 1 taken along the plane and in the direction indicated at 2—2 in FIG. 1;

FIG. 8 is a cross-sectional plan view taken along the plane indicated at 8—8 in FIG. 3.

Figure 3:
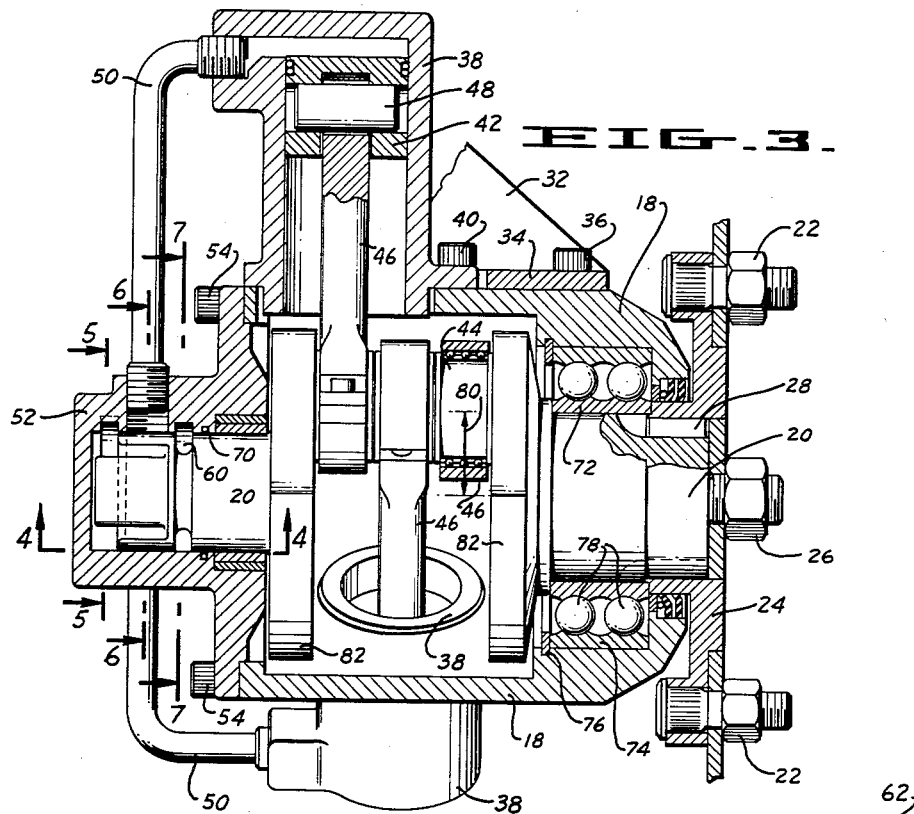
FIG. 3 is a vertical sectional view of the hydraulic motor taken along the plane 3—3 of FIG. 2.
Figure 5:
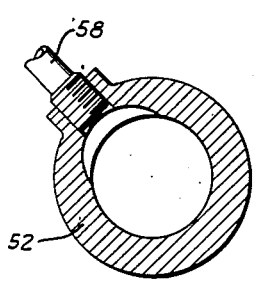
FIGS. 4, 5, 6 and 7 are sectional views of the motor of FIG. 3 taken along the planes indicated by the lines and the arrows at 4—4, etc., in FIG. 3.
Figure 6:
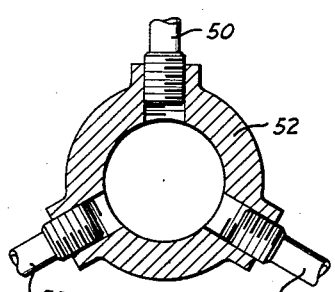
Figure 7:
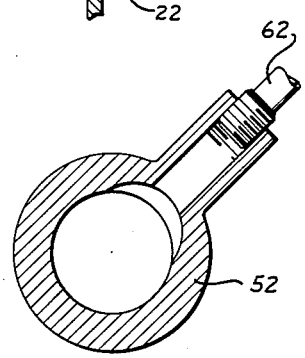

Referring now in detail to the drawings and particularly to FIG. 1, one wheel of the vehicle is illustrated therein as comprising a rim 10 carrying a pneumatic tire 12 and having a hub 14 attached to the rim 10 with the hub having a central hub portion 16 positioned at one side of the rim 10 as illustrated. A hydraulic motor having a body portion 18 and a crank shaft 20 is mounted within the wheel by bolts 22 connecting a flange 24 to the central hub portion 16 with the flange 24 being attached and keyed to the crank shaft 20 by a bolt 26 and key 28 (see FIG. 3) respectively. As best seen in FIG. 1, the hydraulic motor 18 lies substantially completely within the rim 10 of the wheel. The hydraulic motor is mounted on the vehicle chassis by a wheel strut 30 having a diagonal portion 32 thereof extending into the space inside the rim 10 with the lower end of the portion 32 carrying an inturned flange 34 which is attached to the hydraulic motor body 18 by bolts 36. As indicated in FIGS. 1–3, the diagonal portion 32 of the wheel strut 30 is hollowed out to receive one of the cylinders 38 of the hydraulic motor.

As best seen in FIG. 3, the three cylinders 38 are attached to the hydraulic motor body portion 18 by bolts 40 with the three cylinders 38 distributed circumferentially around the body portion 18 and spaced from each other in a direction parallel to the axis of the crank shaft 20. Pistons 42 are mounted in each of the cylinders 38 and connected to the crank arm portion 44 of the crank shaft 20 by means of connecting rods 46 and wrist pins 48.

Figure 4:
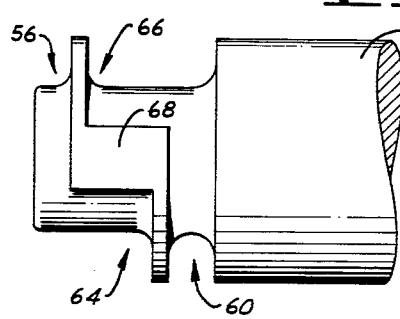

Fluid conduits 50 are connected to the outer ends of the cylinders 38 with the inner ends of the conduits 50 received in a valve housing 52 which is mounted on the body portion 18 of the motor by bolts 54. The crank shaft 20 extends into the valve body 59 as best seen in FIG. 3, and valve passageways are ground into the crank shaft 20 as best seen in FIG. 4. The valve passageways in the crank shaft include an end passageway 56 in permanent communication with a fluid supply conduit 58, an interior passageway 60 which is in permanent communication with a fluid exhaust conduit 62 and a pair of intermediate passageways 64 and 66 which are separated by enlarged portions 68 of the crank shaft 20. The passages 64 and 66 are in permanent communication with the passageways 56 and 60 respectively, and each of the passageways 64 and 66 is moved sequentially over the inner ends of the fluid supply conduits 50 responsive to rotation of the crank shaft 20. Thus, fluid delivered under pressure to the supply conduit 58 is conducted via passageways 56 and 64 to one or two of the conduits 50 and hence to the interior of one or two of the cylinders 38 to effect a power stroke of the pistons in those cylinders. Simultaneously, fluid is exhausted from the remaining cylinders 38 via the conduits 50 connected thereto, the passageways 66 and 60, and the exhaust conduit 62. A suitable fluid seal 70 is provided around the crank shaft 20 adjacent to the passageway 60 to prevent leakage of hydraulic fluid into the interior of the pump body portion 18.

As illustrated in FIG. 3, the entire load transmitted from the strut portion 32 to the wheel hub 24 is carried by the crank shaft 20 in the area closely adjacent to the hub 24. This load is distributed while the crank shaft rotates by the large ball bearing structure illustrated in FIG. 3 where an inner raceway 72 is mounted on the axle portion of the crank shaft 20; an outer raceway 74 is retained inside the body portion 18 of the motor by a snap ring 76, and two rows of balls 78 are carried between the raceways 72 and 74. The radius of the crank shaft axle portion inside the raceway 72 is substantially equal to the distance 80 of the center of the crank arm 44 from the axis of rotation of the crank shaft 20. With this portion of the crank shaft axle having a radius substantially as large as the distance 80, the load transmitted from the strut 32 to the hub 24 is easily withstood by the hydraulic motor without impairing the life of the motor. Additionally, this structure provides efficient connection between the axle portion of the crank shaft 20 and the crank arm portion 44 with counterbalancing masses 82 being formed integrally with the crank shaft while reducing the length of the crank shaft to a sufficient extent that the motor can be contained substantially completely within the wheel. It should be noted that the large radius for the crank shaft axle portion need not be used at the opposite end of the crank shaft (i.e., the end adjacent to the valve body 52) since load transmission is accomplished with the structure in the area of the motor 18 adjacent to the hub 24. In this regard it should also be noted that the one of the cylinders 38 which is farthest away from the hub portion 24 of the wheel is the upper one which is received inside of the strut 32 thereby providing for application of the vehicle's load to the hydraulic motor body 18 in an area as close to the hub 24 as possible; this design permits the use of a strong load transmitting flange 34 very close to the hub 24 as best seen in FIG. 3.

While one specific embodiment of the invention has been shown and described in detail herein, it is obvious that many modifications of the structure disclosed may be made without departing from the spirit and scope of the invention.

We claim:

1. A vehicle comprising a chassis having a wheel thereon with the wheel having a rim defining an open space therein and a hub mounted on the rim with a central hub portion spaced to one side of the rim, a hydraulic motor positioned in said open space and having a body portion and a crank shaft rotatably mounted therein with a plurality of cylinders mounted on said body portion spaced circumferentially around the axis of rotation of said crank shaft, pistons mounted in said cylinders and connected to said crank shaft, valve means connected to said cylinders and crank shaft for controlling the supply of fluid to said cylinders in synchronization with movement of said crank shaft, support means connected to said chassis and positioned adjacent to the side of said rim opposite to said hub and having a strut portion extending therefrom into said open space and connected to said body between one of said cylinders and said hub, means connecting one end of said crank shaft to said hub and bearing means for transmitting load from said body to said crank shaft comprising a large diameter bearing portion of said crank shaft adjacent to said hub, an inner race mounted on said bearing portion, an outer race surrounding said inner race and mounted in said body and antifriction means between said races, said cylinders being spaced from each other axially of said crank shaft, said motor being mounted with the one of said cylinders most remote from said hub extending upwardly, and said strut portion of said support means extending past said one cylinder and having an end connected to said motor at a position between said one cylinder and said hub and vertically above said bearing means.

2. A vehicle comprising a chassis having a wheel thereon with the wheel having a rim defining an open space therein and a hub mounted on said rim with a central hub portion spaced to one side of the rim, a hydraulic motor positioned within said open space and having a crank shaft therein connected to said central hub portion and a plurality of cylinders thereon spaced circumferentially around said crank shaft and spaced from each other axially of said crank shaft, said motor being mounted with the one of said cylinders farthest from said central hub portion extending upwardly, and support means for mounting said motor on said chassis including a strut extending into said open space from the side of said wheel opposite said central hub portion and connected to said motor in an area between said central hub portion and said one cylinder.

3. The apparatus of claim 2 in which said strut comprises a generally U-shaped member having leg portions which straddle said one cylinder with each leg portion having a portion engaging said motor alongside of said one cylinder and a portion engaging said motor between said one cylinder and said central hub portion.

References Cited in the file of this patent

UNITED STATES PATENTS

| | | |
|---|---|---|
| 1,189,042 | Baijer | June 27, 1916 |
| 1,642,103 | Daubenmeyer | Sept. 13, 1927 |
| 1,963,091 | Jenkins | June 19, 1934 |
| 2,682,837 | Schira | July 6, 1954 |